United States Patent [19]

Loev

[11] 3,856,823
[45] Dec. 24, 1974

[54] DIBENZO (B,D) PYRANS
[75] Inventor: Bernard Loev, Broomall, Pa.
[73] Assignee: SmithKline Corporation, Philadelphia, Pa.
[22] Filed: July 18, 1973
[21] Appl. No.: 380,447

[52] U.S. Cl............................... 260/345.3, 424/283
[51] Int. Cl............................................. C07d 7/20
[58] Field of Search................................. 260/345.3

[56] References Cited
FOREIGN PATENTS OR APPLICATIONS
651,653  4/1951  Great Britain................... 260/345.3

Primary Examiner—John M. Ford
Attorney, Agent, or Firm—Joan S. Keps; Richard D. Foggio; William H. Edgerton

[57] ABSTRACT

The compounds of this invention are dibenzo[b,d]pyrans having pharmacological activity such as central nervous system activity. A preferred compound is 3-(1,2-dimethylheptyl)-7,8,9,10-tetrahydro-6,6,9-trimethyl-6H-dibenzo[b,d]pyran.

5 Claims, No Drawings

DIBENZO (B,D) PYRANS

This invention relates to new dibenzo[b,d]pyrans which have pharmacological activity.

The compounds of this invention are represented by the following structural formula:

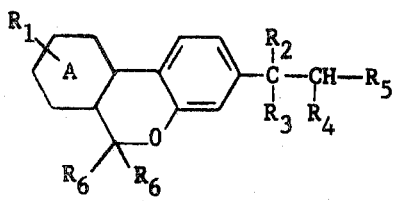

FORMULA I in which:
ring A is a benzene ring, a cyclohexane ring or a cyclohexene ring with the double bond being at position 6a–10a, 8 or 9;
$R_1$ is hydrogen, methyl or ethyl;
$R_2$ is hydrogen, methyl or ethyl and $R_3$ and $R_4$ are hydrogen or methyl, at least one of $R_2$, $R_3$ and $R_4$ being other than hydrogen;
$R_5$ is alkyl of from four to eight carbon atoms; and
$R_6$ is methyl or ethyl.

In the nomenclature used herein the dibenzo[b,d]pyran ring is numbered as follows:

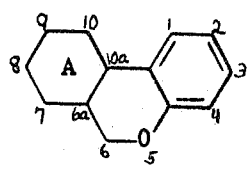

Preferred compounds of this invention are represented by Formula I in which ring A is a cyclohexene ring with the double bond at position 6a–10a. Most preferred are the compounds of Formula I in which ring A is a cyclohexene ring with the double bond at position 6a–10a, $R_2$ is methyl and $R_3$ and $R_4$ are hydrogen or methyl.

Advantageous compounds of this invention are represented by Formula I in which ring A is a cyclohexene ring with the double bond at position 6a–10a, $R_1$ is methyl in the 9-position, $R_2$ and $R_6$ are methyl, $R_3$ and $R_4$ are hydrogen or methyl and $R_5$ is n-pentyl.

Particularly preferred is the compound 3-(1,2-dimethylheptyl)-7,8,9,10-tetrahydro-6,6,9-trimethyl-6H-dibenzo[b,d]pyran. This compound is represented by Formula II:

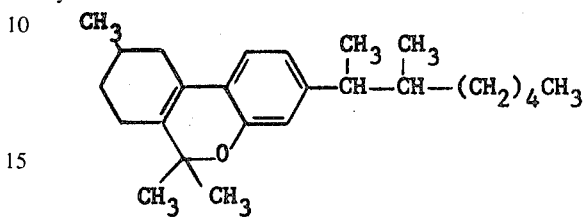

FORMULA II

The compounds of this invention may exist as optical isomers due to the asymmetry of carbon atoms in the side chain and in ring A. All of the isomers, including separated isomers and mixtures thereof, are included within the scope of this invention.

The compounds of Formula I in which ring A is a cyclohexene ring with the double bond at the 6a–10a position are prepared by acid catalyzed, for example sulfuric acid, condensation of a 2-carbalkoxycyclohexanone, for example 2-carbethoxycyclohexanone, with a 3-alkyl phenol followed by treatment of the intermediate 3-alkyl-7,8,9,10-tetrahydro-6H-dibenzo[b,d]pyrone with a methyl or ethyl magnesium halide and subsequent cyclization to the 3-alkyl-7,8,9,10-tetrahydro-6H-dibenzo[b,d]pyran in the presence of an acid solution, for example hydrochloric acid.

The compounds of Formula I in which ring A is a cyclohexene ring with the double bond at the 8 or 9 position are prepared by condensing verbenol or carene oxide or analogs thereof with a 3-alkyl phenol in the presence of an acid such as boron trifluoride etherate [Razdan, et al., *J. Amer. Chem. Soc.* 92:6061 (1970) and Mechoulam, et al., *Arzneim.-Forsch.* 22:1995 (1972)] as shown in the following scheme:

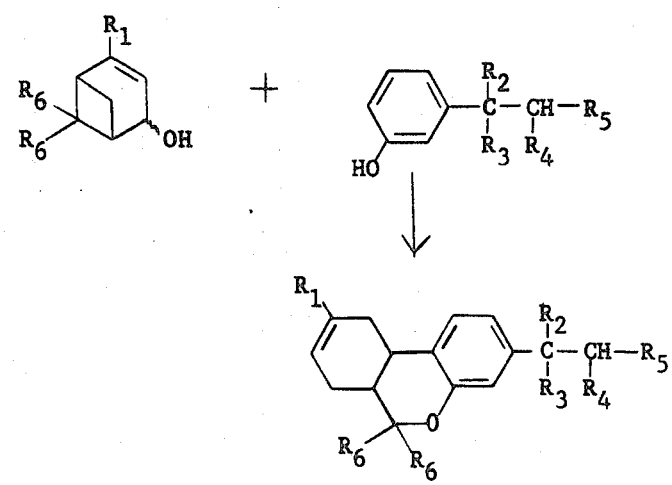

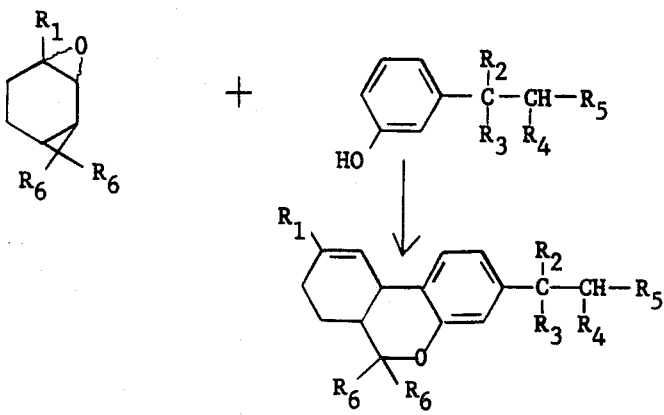

The terms $R_1$–$R_6$ are defined as described above.

Other procedures which may be applied to prepare these compounds are described by Petrzilka, et al., Helv. Chim. Acta 52:1102 (1969), Fahrenholtz, et al., J. Amer. Chem. Soc. 89:5934 (1967) and Mechoulam et al. J. Amer. Chem. Soc. 89:4552 (1967) and in U.S. Pat. No. 3,388,136.

The alkyl substituted phenols are prepared from reaction of a m-methoxyphenyl alkyl ketone, m-methoxybenzaldehyde or m-methoxybenzonitrile with an appropriate Grignard reagent followed by dehydration of the intermediate alcohols, subsequent hydrogenation, then removal of the protective methyl groups by standard procedures, for example with acid, pyridine hydrochloride or boron tribromide.

The compounds in which ring A is benzene are prepared by dehydrogenation of the corresponding compounds of Formula I in which ring A is a cyclohexene ring. The dehydrogenation is carried out either using a catalyst such as palladium on carbon or using a chemical dehydrogenating agent such as 2,3-dichloro-5,6-dicyanoquinone.

The compounds of this invention in which ring A is a cyclohexane ring are prepared from the compounds of Formula I in which ring A is a cyclohexene ring by chemical or catalytic reduction according to standard procedures, for example by the use of palladium on carbon in ethanol.

The compounds of this invention can also be prepared from the known 3-alkyl-1-hydroxy-6H-dibenzo[b,d]-pyrans by Raney nickel reduction of the 3-alkyl-1-thiol-6H-dibenzo[b,d]pyrans obtained from treatment of a 3-alkyl-1-hydroxy-6H-dibenzo[b,d]pyran with dimethylthiocarbamyl chloride followed by rearrangement of the dimethylthionecarbamate to a dimethylthiolcarbamate and subsequent treatment with a base such as potassium hydroxide according to the procedure described by Newman, et al., [J. Org. Chem. 31:3980 (1966); Org. Syn. 51:139 (1971)]. Other procedures which may be used are described by Kenner, et al., J. Chem. Soc. 522 (1955), Pirkle, et al., J. Org. Chem. 29:3124 (1964) and Musliner, et al., J. Amer. Chem. Soc. 88:4271 (1966).

The compounds of this invention have pharmacological activity such as central nervous system activity; for example the compounds have central nervous system depressant, sedative and tranquilizing activity. In addition, the compounds may have analgesic, hypotensive, anti-inflammatory and diuretic activity.

It is well known that 3-n-amyl-1-hydroxy-7,8,9,10-tetrahydro-6,6,9-trimethyl-6H-dibenzo[b,d]pyran shows central nervous system activity. Alles, et al., [J. Amer. Chem. Soc. 64:2031 (1942)] have demonstrated that replacement of the 1-hydroxy group of this compound by hydrogen resulted in a compound having no significant degree of central nervous system activity in rabbits or dogs. However, the 3-branched alkyl-dibenzo[b,d]pyran compounds of this invention, which are unsubstituted in the 1-position, produce decreased spontaneous motor activity when administered orally to rats at a dose of about 50 mg./kg.

One skilled in the art will recognize that in determining the amounts of the compound to produce the desired Pharmacological effect, the activity of the compound as well as the size of the host animal must be considered.

The compounds of this invention may be combined with standard pharmaceutical carriers and administered internally in conventional dosage forms such capsules, tablets or liquid preparations.

The following examples illustrate the invention but are not to be construed as limiting the scope thereof. Temperatures are in degrees Centigrade unless otherwise stated.

EXAMPLE 1

3-(1,2-Dimethylheptyl)-7,8,9,10-tetrahydro-6,6,9-trimethyl-6H-dibenzo[b,d]pyran

To the Grignard reagent prepared from 13.3 g. (0.56 mol.) of magnesium turnings and 100 g. (0.56 mol.) of 2-bromoheptane in anhydrous ether under a nitrogen atmosphere was added with stirring a solution of 41.5 g. (0.28 mol.) of m-methoxyacetophenone in 200 ml. of anhydrous tetrahydrofuran. After refluxing for 12 hours the mixture was quenched with 300 ml. of saturated aqueous ammonium chloride and extracted with ether. The extracts were washed ($H_2O$), dried ($MgSO_4$) and the solvent was removed to give 2-(3-methoxyphenyl)-3-methyl-2-octanol as an oil. The carbinol was dehydrated by distillation in vacuo from a few drops of 20% sulfuric acid to yield the corresponding olefin. A solution of the olefin in ethanol was hydrogenated in the presence of 10% palladium on carbon until cessation of hydrogen uptake. Filtration and evaporation of the filtrate in vacuo gave 3-(1,2-dimethylheptyl)phenol methyl ether, which was demethylated by refluxing with 48% hydrogen bromide in glacial acetic acid for four hours. The resultant reaction mixture was poured onto ice, neutralized to pH 4–5 with 10N sodium hydroxide and extracted with ether. The extracts were combined and extracted with 2N sodium hydroxide and the extracts were acidified with acetic acid, re-extracted with ether and dried (MgSO₄). Concentration in vacuo and distillation of the residue gave 3-(1,2-dimethylheptyl)-phenol, b.p. 105°–110° (0.1 mm.).

To a cooled (−5°) mixture of 9.0 g. (0.041 mol.) of 3-(1,2-dimethylheptyl)phenol and 6.95 g. (0.041 mol.) of 5-methyl-2-carbethoxycyclohexanone was added 35 ml. of precooled (0°) concentrated sulfuric acid in such manner that the temperature did not rise above 5° during addition. The reaction mixture was stirred at 0° for 15 minutes, then it was warmed to room temperature and stirred for 1.5 hours after which time it was poured into 300 ml. of ice-water. The aqueous mixture was extracted with ethyl acetate and the extracts were washed with water and saturated sodium chloride solution, dried (MgSO₄) and concentrated in vacuo to give an oil which was chromatographed on silica gel with 50:50 benzenecyclohexane. The product was distilled (b.p. 187°–190°, 0.025 mm.) and the distillate crystallized upon trituration with hexane, m.p. 84°–86°.

To a stirred solution of 25 ml. (0.053 mol.) of a 2M solution of methyl magnesium bromide in benzenetetrahydrofuran, under nitrogen, was added a solution of 3.0 g. (0.088 mol.) of 3-(1,2-dimethylheptyl)-7,8,9,10-tetrahydro-9-methyl-6H-dibenzo[b,d]pyrone in 100 ml. of dry tetrahydrofuran. The reaction mixture was refluxed for 24 hours then stirred at 25° for 2 days after which time it was poured into a dilute hydrochloric acid-ice mixture. Ether was added, the layers were separated and the organic phase was washed with water, 5% aqueous sodium bicarbonate and saturated sodium chloride solution, dried (MgSO₄) and concentrated in vacuo. The residue was dissolved in 100 ml. of dry benzene and treated with 200 ml. of ethereal hydrogen chloride. The mixture was refluxed for 2 hours, then cooled and concentrated to give a residue which was distilled to give the title compound, b.p. 165°–168° (0.03 mm.).

Alternatively, the title compound is prepared by addition of a solution of 3.7 g. (0.01 mol.) of 3-(1,2-dimethylheptyl)-1-hydroxy-7,8,9,10-tetrahydro-6,6,9-trimethyl-6H-dibenzo[b,d]pyran in 30 ml. of dry dimethylformamide to a suspension of sodium hydride in 20 ml. of dry dimethylformamide. After cessation of hydrogen evolution, 1.5 g. (0.012 mol.) of dimethylthiocarbamyl chloride is added dropwise with moderate cooling to maintain the temperature at 20°–25°. After addition, the reaction mixture is heated at 85° for 5 hours then cooled to 25° and poured into 500 ml. of 2% aqueous potassium hydroxide solution. The mixture is extracted with ether and the extracts are washed with 2% aqueous potassium hydroxide until neutral, then with water and dried (MgSO₄). Evaporation of the solvent gives 3-(1,2-dimethylheptyl)-1-dimethylthionecarbamate-7,8,9,10-tetrahydro-6,6,9-trimethyl-6H-dibenzo[b,d]pyran which is then heated at 250°–255° for 2 hours under a stream of nitrogen. After cooling, the crude dimethylthiolcarbamate is dissolved in 50 ml. of methanol to which is added 25 ml. of 10% aqueous potassium hydroxide. After refluxing under nitrogen for one hour, the reaction mixture is cooled, diluted with 500 ml. of 5% hydrochloric acid and extracted with ether. The extracts are washed with water, dried (MgSO₄) and concentrated to give a residue which is dissolved in 100 ml. of ethanol containing 30 g. of Raney nickel (W-2) and refluxed for 13 hours. After cooling, the slurry is filtered and the filtrate is concentrated to yield a residue which is distilled in vacuo to give the title compound.

EXAMPLE 2

3-(2-Methylheptyl)-7,8,9,10-tetrahydro-6,6,9-trimethyl-6H-dibenzo[b,d]pyran

When an equivalent amount of m-methoxybenzaldehyde is substituted in the procedure of Example 1 for m-methoxyacetophenone, 3-(2-methylheptyl)phenol is obtained.

Condensation of equivalent amounts of 3-(2-methylheptyl)phenol and 5-methyl-2-carbethoxycyclohexanone followed by reaction with methyl magnesium bromide and cyclization of the intermediate carbinol as described in Example 1 gives the title compound.

EXAMPLE 3

3-(1,1,2-Trimethylheptyl)-7,8,9,10-tetrahydro-6,6,9-trimethyl-6H-dibenzo[b,d]pyran To a two-fold excess of methyl magnesium bromide in ether is slowly added one equivalent of 3-methoxyphenyl-α,α-dimethylacetonitrile in ether at a rate to maintain gentle reflux. The mixture is refluxed for 18 hours and then poured into an ice water-hydrochloric acid mixture and allowed to come to room temperature. The layers are separated and the aqueous layer is extracted with ether. The organic layer and extracts are combined, washed with water, dried with magnesium sulfate and evaporated. The residue is distilled under high vacuum to give 3-methoxyphenyl-α,α-dimethylbenzyl methyl ketone.

By the procedure described in Example 1, 3-methoxyphenyl-α,α-dimethylbenzyl methyl ketone is reacted with n-pentyl magnesium bromide; the resulting 3-(2-hydroxy-1,1,2-trimethylheptyl)anisole is dehydrated and reduced and the methoxy group is demethylated to give 3-(1,1,2-trimethylheptyl)phenol.

Condensation of equivalent amounts of 3-(1,1,2-trimethylheptyl)phenol and 5-methyl-2-carbethoxycyclohexanone followed by reaction of the dibenzo[b,d]pyrone with methyl magnesium bromide and cyclization of the intermediate carbinol as described in Example 1 gives the title compound.

EXAMPLE 4

3-(1-Ethyl-2-methylheptyl)-7,8,9,10-tetrahydro-6,6,9-trimethyl-6H-dibenzo[b,d]pyran Substitution of an equivalent amount of m-methoxyphenyl ethyl ketone into the procedure of Example 1 for m-methoxyacetophenone gives 3-(1-ethyl-2-methylheptyl)phenol.

Condensation of equivalent amounts of 3-(1-ethyl-2-methylheptyl)phenol and 5-methyl-2-carbethoxycyclohexanone followed by reaction of the dibenzo[b,d]pyrone with methyl magnesium bromide and cyclization of the resultant carbinol as described in Example 1 gives the title compound.

EXAMPLE 5

3-(1,2-Dimethyloctyl)-7,8,9,10-tetrahydro-6,6,9-trimethyl-6H-dibenzo[b,d]pyran

When an equivalent amount of 2-bromooctane is substituted in the procedure of Example 1 for 2-bromoheptane, 3-(1,2-dimethyloctyl)phenol is obtained.

Condensation of equivalent amounts of 3-(1,2-dimethyloctyl)phenol and 5-methyl-2-carbethoxycyclohexanone followed by reaction of the dibenzo[b,d]-pyrone with methyl magnesium bromide and cyclization of the intermediate carbinol as described in Example 1 gives the title compound.

EXAMPLE 6

3-(1,2-Dimethyldecyl)-7,8,9,10-tetrahydro-6,6,9-trimethyl-6H-dibenzo[b,d]pyran

Substitution of an equivalent amount of 2-bromodecane in the procedure of Example 1 for 2-bromoheptane gives 3-(1,2-dimethyldecyl)phenol.

Condensation of equivalent amounts of 3-(1,2-dimethyldecyl)phenol and 5-methyl-2-carbethoxycyclohexanone followed by reaction of the dibenzo[b,d]-pyrone with methyl magnesium bromide and cyclization of the resultant carbinol as described in Example 1 gives the title compound.

EXAMPLE 7

3-(1,2-Dimethylhexyl)-7,8,9,10-tetrahydro-6,6,9-trimethyl-6H-dibenzo[b,d]pyran

When an equivalent amount of 2-bromohexane is substituted in the procedure of Example 1 for 2-bromoheptane, 3-(1,2-dimethylhexyl)phenol is obtained.

Condensation of equivalent amounts of 3-(1,2-dimethylhexyl)phenol and 5-methyl-2-carbethoxycyclohexanone followed by reaction of the dibenzo[b,d]pyrone with methyl magnesium bromide and cyclization of the resultant carbinol as described in Example 1 gives the title compound.

EXAMPLE 8

3-(1,2-Dimethylheptyl)-6a,7,8,10a-tetrahydro-6,6,9-trimethyl-6H-dibenzo[b,d]pyran To a stirred solution of 2.2 g. (0.01 mol.) of 3-(1,2-dimethylheptyl)phenol and 1.5 g. (0.01 mol.) of (+)-trans-2-carene oxide [*Izv. Akad. Nauk SSR, Sor. Khim.* 954 (1967)] in methylene chloride is added a 1% solution of boron trifluoride etherate in methylene chloride. The reaction mixture is stirred at 25° for 4 hours, then ether and water are added and the layers are separated. The aqueous phase is extracted with ether and the organic layers are combined, washed with 5% aqueous sodium bicarbonate, dried (MgSO$_4$) and concentrated. Chromatography of the residue on Florosil gives a mixture of cis and trans isomers of the title compound which is separated by standard preparative vapor phase chromatographic methods.

EXAMPLE 9

3-(1,2-Dimethylheptyl)-6a,7,10,10a-tetrahydro-6,6,9-trimethyl-6H-dibenzo[b,d]pyran Substitution of 1.5 g. (0.01 mol.) of cisverbenol in the procedure of Example 8 for trans-2-carene oxide gives the title compound.

EXAMPLE 10

3-(1,2-Dimethylheptyl)-6,6,9-trimethyl-6H-dibenzo[b,d]pyran

A solution of 2.0 g. of 3-(1,2-dimethylheptyl)-7,8,9,10-tetrahydro-6,6,9-trimethyl-6H-dibenzo[b,d]pyran in 70 cc. of dry p-cymene is added dropwise at reflux to a well stirred suspension of 660 mg. of 10% palladium on carbon in 70 cc. of dry p-cymene, which is bubbled continuously with nitrogen. The addition is made over 45 minutes. Refluxing is continued for an additional hour, and the mixture is then cooled, chloroform is added and the catalyst is filtered off. The chloroform solution is evaporated in vacuo. The residue is chromatographed on a silica gel "drycolumn" (20 inches × 1.5 inches), using 6:4 chloroform-cyclohexane as the eluant. The fractions are eluted and distilled to give the title compound.

In like manner, the title compound may be obtained from 3-(1,2-dimethylheptyl)-6a,7,8,10a-tetrahydro-6,6,9-trimethyl-6H-dibenzo[b,d]pyran or from 3-(1,2-dimethylheptyl)-6a,7,10,10a-tetrahydro-6,6,9-trimethyl-6H-dibenzo[b,d]pyran.

EXAMPLE 11

3-(1,2-Dimethylheptyl)-6a,7,8,9,10,10a-hexahydro-6,6,9-trimethyl-6H-dibenzo[b,d]pyran A mixture of 2.9 g. (8.1 mmol.) of 3-(1,2-dimethylheptyl)-7,8,9,10-tetrahydro-6,6,9-trimethyl-6H-dibenzo[b,d]pyran in 100 ml. of absolute ethanol and 10% palladium on carbon is hydrogenated at 48 p.s.i. and 25° until 8 mmol. of hydrogen is absorbed. After addition of a small amount of chloroform the mixture is filtered, the solvent is evaporated and the residue is distilled to give the title compound.

In like manner, the title compound may be obtained from 3-(1,2-dimethylheptyl)-6a,7,8,10a-tetrahydro-6,6,9-trimethyl-6H-dibenzo[b,d]pyran or from 3-(1,2-dimethylheptyl)-6a,7,10,10a-tetrahydro-6,6,9-trimethyl-6H-dibenzo[b,d]pyran.

EXAMPLE 12

When equivalent amounts of 4-methyl-2-carbethoxycyclohexanone and 3-(1,2-dimethylheptyl)phenol are condensed according to the procedure of Example 1 and the resulting dibenzo[b,d]pyrone is reacted with methyl magnesium bromide and subsequently cyclized as described, 3-(1,2-dimethylheptyl)-7,8,9,10-tetrahydro-6,6,8-trimethyl-6H-dibenzo[b,d]pyran is obtained.

In a similar manner, 3-(1,2-dimethylheptyl)-7,8,9,10-tetrahydro-6,6,7-trimethyl-6H-dibenzo[b,d]pyran is obtained from 3-methyl-2-carbethoxycyclohexanone and 3-(1,2-dimethylheptyl)-phenol.

Likewise, 3-(1,2-dimethylheptyl)-7,8,9,10-tetrahydro-6,6,10-trimethyl-6H-dibenzo[b,d]pyran is prepared from 6-methyl-2-carbethoxycyclohexanone and 3-(1,2-dimethylheptyl)phenol.

EXAMPLE 13

3-(1,2-Dimethylheptyl)-7,8,9,10-tetrahydro-6,6-dimethyl-6H-dibenzo[b,d]pyran

Condensation of 3-(1,2-dimethylheptyl)phenol with an equivalent amount of 2-carbethoxycyclohexanone according to the procedure of Example 1 followed by reaction of the dibenzo[b,d]pyrone with methyl magnesium bromide and subsequent cyclization gives the title compound.

EXAMPLE 14

3-(1,2-Dimethylheptyl)-7,8,9,10-tetrahydro-9-ethyl-6,6-dimethyl-6H-dibenzo[b,d]pyran When an equivalent amount of 5-ethyl-2-carbethoxycyclohexanone is substituted in the procedure of Example 1 for 5-methyl-2-carbethoxycyclohexanone, 3-

(1,2-dimethylheptyl)-7,8,9,10-tetrahydro-9-ethyl-6,6-dimethyl-6H-dibenzo[b,d]pyran is obtained.

EXAMPLE 15

3-(1,2-Dimethylheptyl)-7,8,9,10-tetrahydro-9-methyl-6,6-diethyl-6H-dibenzo[b,d]pyran When 3-(1,2-dimethylheptyl)-7,8,9,10-tetrahydro-9-methyl-6H-dibenzo[b,d]pyrone is reacted with ethyl magnesium bromide according to the procedure described in Example 1 with subsequent cyclization of the carbinol, the title compound is obtained.

EXAMPLE 16

When an equivalent amount of a phenol listed below:
3-(2-methylheptyl)phenol
3-(1,1,2-trimethylheptyl)phenol
3-(1-ethyl-2-methylheptyl)phenol
3-(1,2-dimethyloctyl)phenol
3-(1,2-dimethyldecyl)phenol
3-(1,2-dimethylhexyl)phenol
is substituted in the procedure of Example 12 for 3-(1,2-dimethylheptyl)phenol, the following dibenzo[b,d]pyrans are obtained:
3-(2-methylheptyl)-7,8,9,10-tetrahydro-6,6,8-trimethyl-6H-dibenzo[b,d]pyran
3-(1,1,2-trimethylheptyl)-7,8,9,10-tetrahydro-6,6,8-trimethyl-6H-dibenzo[b,d]pyran
3-(1-ethyl-2-methylheptyl)-7,8,9,10-tetrahydro-6,6,8-trimethyl-6H-dibenzo[b,d]pyran
3-(1,2-dimethyloctyl)-7,8,9,10-tetrahydro-6,6,8-trimethyl-6H-dibenzo[b,d]pyran
3-(1,2-dimethyldecyl)-7,8,9,10-tetrahydro-6,6,8-trimethyl-6H-dibenzo[b,d]pyran
3-(1,2-dimethylhexyl)-7,8,9,10-tetrahydro-6,6,8-trimethyl-6H-dibenzo[b,d]pyran.

In like manner, the corresponding 6,6,7-trimethyl and 6,6,10-trimethyl-6H-dibenzo[b,d]pyrans are obtained.

EXAMPLE 17

Substitution of an equivalent amount of a phenol listed in Example 16 in the procedure of Example 13 for 3-(1,2-dimethylheptyl)phenol gives the following dibenzo[b,d]pyrans:
3-(2-methylheptyl)-7,8,9,10-tetrahydro-6,6-dimethyl-6H-dibenzo[b,d]pyran
3-(1,1,2-trimethylheptyl)-7,8,9,10-tetrahydro-6,6-dimethyl-6H-dibenzo[b,d]pyran
3-(1-ethyl-2-methylheptyl)-7,8,9,10-tetrahydro-6,6-dimethyl-6H-dibenzo[b,d]pyran
3-(1,2-dimethyloctyl)-7,8,9,10-tetrahydro-6,6-dimethyl-6H-dibenzo[b,d]pyran
3-(1,2-dimethyldecyl)-7,8,9,10-tetrahydro-6,6-dimethyl-6H-dibenzo[b,d]pyran
3-(1,2-dimethylhexyl)-7,8,9,10-tetrahydro-6,6-dimethyl-6H-dibenzo[b,d]pyran.

EXAMPLE 18

Substitution of an equivalent amount of a phenol listed in Example 16 in the procedure of Example 14 for 3-(1,2-dimethylheptyl)phenol gives the following dibenzo[b,d]pyrans:
3-(2-methylheptyl)-7,8,9,10-tetrahydro-9-ethyl-6,6-dimethyl-6H-dibenzo[b,d]pyran
3-(1,1,2-trimethylheptyl)-7,8,9,10-tetrahydro-9-ethyl-6,6-dimethyl-6H-dibenzo[b,d]pyran
3-(1-ethyl-2-methylheptyl)-7,8,9,10-tetrahydro-9-ethyl-6,6-dimethyl-6H-dibenzo[b,d]pyran
3-(1,2-dimethyloctyl)-7,8,9,10-tetrahydro-9-ethyl-6,6-dimethyl-6H-dibenzo[b,d]pyran
3-(1,2-dimethyldecyl)-7,8,9,10-tetrahydro-9-ethyl-6,6-dimethyl-6H-dibenzo[b,d]pyran
3-(1,2-dimethylhexyl)-7,8,9,10-tetrahydro-9-ethyl-6,6-dimethyl-6H-dibenzo[b,d]pyran.

EXAMPLE 19

Substitution of an equivalent amount of a phenol listed in Example 16 in the procedure of Example 15 for 3-(1,2-dimethylheptyl)phenol gives the following dibenzo[b,d]pyrans:
3-(2-methylheptyl)-7,8,9,10-tetrahydro-9-methyl-6,6-diethyl-6H-dibenzo[b,d]pyran
3-(1,1,2-trimethylheptyl)-7,8,9,10-tetrahydro-9-methyl-6,6-diethyl-6H-dibenzo[b,d]pyran
3-(1-ethyl-2-methylheptyl)-7,8,9,10-tetrahydro-9-methyl-6,6-diethyl-6H-dibenzo[b,d]pyran
3-(1,2-dimethyloctyl)-7,8,9,10-tetrahydro-9-methyl-6,6-diethyl-6H-dibenzo[b,d]pyran
3-(1,2-dimethyldecyl)-7,8,9,10-tetrahydro-9-methyl-6,6-diethyl-6H-dibenzo[b,d]pyran
3-(1,2-dimethylhexy)-7,8,9,10-tetrahydro-9-methyl-6,6-diethyl-6H-dibenzo[b,d]pyran.

EXAMPLE 20

By the procedure of Example 10 the dibenzo[b,d]pyrans listed below:
3-(2-methylheptyl)-7,8,9,10-tetrahydro-6,6,9-trimethyl-6H-dibenzo[b,d]pyran
3-(1,1,2-trimethylheptyl)-7,8,9,10-tetrahydro-6,6,9-trimethyl-6H-dibenzo[b,d]pyran
3-(1-ethyl-2-methylheptyl)-7,8,9,10-tetrahydro-6,6,9-trimethyl-6H-dibenzo[b,d]pyran
3-(1,2-dimethyloctyl)-7,8,9,10-tetrahydro-6,6,9-trimethyl-6H-dibenzo[b,d]pyran
3-(1,2-dimethyldecyl)-7,8,9,10-tetrahydro-6,6,9-trimethyl-6H-dibenzo[b,d]pyran
3-(1,2-dimethylhexyl)-7,8,9,10-tetrahydro-6,6,9-trimethyl-6H-dibenzo[b,d]pyran
are dehydrogenated to give the following aromatized dibenzo[b,d]pyrans:
3-(2-methylheptyl)-6,6,9-trimethyl-6H-dibenzo[b,d]pyran
3-(1,1,2-trimethylheptyl)-6,6,9-trimethyl-6H-dibenzo[b,d]pyran
3-(1-ethyl-2-methylheptyl)-6,6,9-trimethyl-6H-dibenzo[b,d]pyran
3-(1,2-dimethyloctyl)-6,6,9-trimethyl-6H-dibenzo[b,d]pyran
3-(1,2-dimethyldecyl)-6,6,9-trimethyl-6H-dibenzo[b,d]pyran
3-(1,2-dimethylhexyl)-6,6,9-trimethyl-6H-dibenzo[b,d]pyran.

In like manner, the 6a,7,8,10a-tetrahydro, 6a,7,10,10a-tetrahydro, 6,6,9-trimethyl, 6,6,7-trimethyl, 6,6,10-trimethyl, 6,6-dimethyl, 9-methyl-6,6-diethyl and 9-ethyl-6,6-dimethyl dibenzo[b,d]pyrans disclosed herein may be dehydrogenated to the corresponding aromatic dibenzo[b,d]pyrans.

EXAMPLE 21

By the procedure of Example 11 the 7,8,9,10-tetrahydro-6H-dibenzo[b,d]pyrans listed in Example 20 are hydrogenated to the corresponding 6a,7,8,9,10,10a-hexahydro-6H-dibenzo[b,d]pyrans listed below:
3-(2-methylheptyl)-6a,7,8,9,10,10a-hexahydro-6,6,9-trimethyl-6H-dibenzo[b,d]pyran
3-(1,1,2-trimethylheptyl)-6a,7,8,9,10,10a-hexahydro-6,6,9-trimethyl-6H-dibenzo[b,d]pyran
3-(1-ethyl-2-methylheptyl)-6a,7,8,9,10,10a-hexahydro-6,6,9-trimethyl-6H-dibenzo[b,d]pyran 3-(1,2-dimethyloctyl)-6a,7,8,9,10,10a-hexahydro-6,6,9-trimethyl-6H-dibenzo[b,d]pyran 3-(1,2-dimethyldecyl)-6a,7,8,9,10,10a-hexahydro-6,6,9-trimethyl-6H-dibenzo[b,d]pyran 3-(1,2,-dimethylhexyl)-6a,7,8,9,10,10a-hexahydro-6,6,9-trimethyl-6H-dibenzo[b,d]pyran.

Similarly, the 6a,7,8,10a-tetrahydro, 6a,7,10,10a-tetrahydro, 6,6,8-trimethyl, 6,6,7-trimethyl, 6,6,10-trimethyl, 9-methyl-6,6-diethyl and 9-ethyl-6,6-dimethyl dibenzo[b,d]pyrans disclosed herein may be hydrogenated to the corresponding hexahydro dibenzo[b,d]pyrans.

What is claimed is:

1. A compound formula:

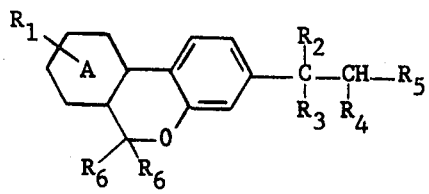

in which:

ring A is a benzene ring, a cyclohexane ring or a cyclohexene ring with the double bond being at position 6a–10a, 8 or 9;

$R_1$ is hydrogen, methyl or ethyl;

$R_2$ is hydrogen, methyl or ethyl and $R_3$ and $R_4$ are hydrogen or methyl, at least one of $R_2$, $R_3$ and $R_4$ being other than hydrogen;

$R_5$ is alkyl of from four to eight carbon atoms; and $R_6$ is methyl or ethyl.

2. A compound as claimed in claim 1 where ring A is a cyclohexene ring with a double bond at position 6a–10a.

3. A compound as claimed in claim 2 where $R_2$ is methyl and $R_3$ and $R_4$ are hydrogen or methyl.

4. A compound as claimed in claim 3 where $R_1$ is methyl in the 9-position, $R_5$ is n-pentyl and $R_6$ is methyl.

5. A compound as claimed in claim 4 being the compound 3-(1,2-dimethylheptyl)-7,8,9,10-tetrahydro-6,6,9-trimethyl-6H-dibenzo[b,d]pyran.

* * * * *

PO-1050
(5/69)

UNITED STATES PATENT OFFICE
CERTIFICATE OF CORRECTION

Patent No. 3,856,823　　　　　　　Dated December 24, 1974

Inventor(s) Bernard Loev

It is certified that error appears in the above-identified patent and that said Letters Patent are hereby corrected as shown below:

Column 11, line 14, after "compound" insert -- of the -- .

Signed and sealed this 1st day of April 1975.

(SEAL)
Attest:

RUTH C. MASON
Attesting Officer

C. MARSHALL DANN
Commissioner of Patents
and Trademarks